United States Patent
Isomura

(10) Patent No.: US 10,913,418 B2
(45) Date of Patent: Feb. 9, 2021

(54) ATTACHMENT STRUCTURE FOR PROTECTOR MEMBER

(71) Applicant: NIFCO INC., Yokosuka (JP)

(72) Inventor: Tsunehisa Isomura, Yokosuka (JP)

(73) Assignee: NIFCO INC., Yokosuka (JP)

( * ) Notice: Subject to any disclaimer, the term of this patent is extended or adjusted under 35 U.S.C. 154(b) by 69 days.

(21) Appl. No.: 16/290,043

(22) Filed: Mar. 1, 2019

(65) Prior Publication Data

US 2019/0270422 A1 Sep. 5, 2019

(30) Foreign Application Priority Data

Mar. 5, 2018 (JP) .................................. 2018-038343

(51) Int. Cl.
*B60R 19/38* (2006.01)
*B60R 19/24* (2006.01)
*B60R 19/02* (2006.01)

(52) U.S. Cl.
CPC ............ *B60R 19/38* (2013.01); *B60R 19/023* (2013.01); *B60R 19/24* (2013.01); *B60R 2019/245* (2013.01)

(58) Field of Classification Search
CPC ....... B60R 19/38; B60R 19/24; B60R 19/023; B60R 2019/245
USPC ........................................................ 293/102
See application file for complete search history.

(56) References Cited

U.S. PATENT DOCUMENTS

| | | | |
|---|---|---|---|
| 6,502,874 B2 * | 1/2003 | Kajiwara | ................ B60R 19/18 293/120 |
| 8,104,805 B2 | 1/2012 | Suzuki et al. | |
| 8,308,184 B2 * | 11/2012 | Hodoya | ................ B60D 1/565 280/495 |

FOREIGN PATENT DOCUMENTS

| | | |
|---|---|---|
| JP | S59-150664 U | 10/1984 |
| JP | 2008-265694 A | 11/2008 |
| JP | 2009-113563 A | 5/2009 |
| JP | 2009113563 A * | 5/2009 |

OTHER PUBLICATIONS

Japan Patent Office, "Office Action for Japanese Patent Application No. 2018-038343," dated Oct. 20, 2020.

* cited by examiner

*Primary Examiner* — Joseph D. Pape
*Assistant Examiner* — Dana D Ivey
(74) *Attorney, Agent, or Firm* — Manabu Kanesaka

(57) ABSTRACT

An attachment structure for a protector member is provided, wherein a positional accuracy regarding the protector member for a reinforcement can be improved. The attachment structure for the protector member for attaching the resin-made protector member located between the reinforcement and a bumper to the reinforcement includes a fastening structure of fastening the protector member to the reinforcement such that an attachment position of the protector member relative to the reinforcement is adjustable in a longitudinal direction of the reinforcement.

4 Claims, 5 Drawing Sheets

ATTACHMENT STRUCTURE FOR PROTECTOR MEMBER

CROSS-REFERENCE TO RELATED APPLICATION

The present application is based on and claims priority of Japanese Patent Application No. 2018-038343 filed on Mar. 5, 2018, the disclosure of which is incorporated herein.

BACKGROUND OF THE INVENTION AND RELATED ART STATEMENT

The present invention relates to an attachment structure for a protector member which is attached to the protector member for reinforcement.

A bumper of a vehicle has, for example, a complicated curved plate shape in order to enhance a design of the vehicle.

The reinforcement of the vehicle has, for example, a simple rectangular tube shape in order to reinforce a vehicle structure.

The protector member for the reinforcement is a resin-made member, and is disposed in a gap between the bumper and the reinforcement. The protector member for the reinforcement is attached to a predetermined attachment portion in the reinforcement, and when the bumper receives a shock from outside, the bumper is prevented from becoming depressed largely at the gap between the reinforcement and the bumper (for example, see Patent Document 1).

Patent Document 1

Japanese Unexamined Patent Application Publication No. 2009-113563

SUMMARY OF THE INVENTION

Problems to be Solved by the Invention

However, the reinforcement of the vehicle has a shape extending in a width direction of the vehicle, and a large dimension error easily occurs in the width direction of the vehicle. Then, the dimension error of the reinforcement reduces a relative positional accuracy between an attachment position of the protector member and the bumper, and reduces a relative positional accuracy between the protector member and the bumper. Therefore, in the attachment structure for the protector member, it is desired to enhance a positional accuracy of the protector member. The present invention is to provide the attachment structure for the protector member wherein the protector member for the reinforcement can improve the positional accuracy.

Further objects and advantages of the invention will be apparent from the following description of the invention.

Means to Solve the Invention

In an attachment structure for a protector member for solving the aforementioned problems, a resin-made protector member is positioned between a reinforcement and a bumper and is attached to the reinforcement. The attachment structure comprises a fastening structure of fastening the protector member to the reinforcement so as to adjust an attachment position of the protector member relative to the reinforcement in a longitudinal direction of the reinforcement.

As described above, in the attachment position of the protector member, shift may occur in the longitudinal direction caused by a dimension error of the reinforcement. In this respect, according to the aforementioned attachment structure, the reinforcement and the protector member can be relatively displaced in the longitudinal direction, so that even in a case wherein the shift occurs at the attachment position, the protector member can be disposed at a position to be originally disposed. As a result, the protector member can be disposed at an attachment position to be originally required.

In the attachment structure for the protector member, the fastening structure may comprise a fastening member inserted to pass through a first hole provided in the reinforcement and a second hole provided in the protector member to fasten the protector member to the reinforcement, and at least one of the first hole and the second hole may be a long or elongated hole extending in the longitudinal direction of the reinforcement.

According to the attachment structure for the protector member, the fastening member is inserted to pass through both the first hole and the second hole. Then, at least one of the first hole and the second hole is the long hole extending in the longitudinal direction of the reinforcement. Consequently, a relative position between the protector member and the reinforcement can be displaced in the longitudinal direction. At that time, in a state wherein the fastening member is inserted to pass through the first hole and the second hole, and in a state before fastening is completed, the protector member can be displaced. Therefore, when the attachment position of the protector member is adjusted, a load of an operation thereof is reduced.

In the attachment structure for the protector member, the reinforcement may comprise a reinforcement main member including a fitting hole, and a resin-made clip to fit into the fitting hole, and the protector member and the resin-made clip may be fastened by the fastening member such that the attachment position of the protector member can be adjusted in the longitudinal direction of the reinforcement main member, and in the fastening structure, the attachment position of the protector member may be adjustable by a displacement of the protector member relative to the resin-made clip.

According to the attachment structure for the protector member, the protector member and the resin-made clip are fastened, and by the displacement of the protector member relative to the resin-made clip, the displacement of the protector member relative to the reinforcement can be achieved. As a result, upon a structure wherein the attachment position of the protector member is adjustable, an occurrence of a design change in the reinforcement can be suppressed.

In the attachment structure for the protector member, the fastening structure may comprise a fastening member inserted to pass through the first hole provided in the resin-made clip and the second hole provided in the protector member to fasten the protector member to the reinforcement, and at least one of the first hole and the second hole may be the long hole extending in the longitudinal direction of the reinforcement.

According to the attachment structure for the protector member, in the state wherein the fastening member is inserted to pass through the first hole and the second hole, and in the state before the fastening is completed, the protector member can be displaced in the longitudinal direction. Therefore, in a state wherein the protector member is temporarily fastened to the reinforcement, the attachment position of the protector member is adjustable, and a load of an adjustment operation thereof is reduced.

In the attachment structure for the protector member, the reinforcement may comprise a front face wall wherein the fitting hole is formed. The protector member may comprise an outer wall wherein the second hole is formed and facing the bumper; an inner wall facing the outer wall; and a groove portion divided into the outer wall and the inner wall. Also, the front face wall may be inserted into the groove portion together with the resin-made clip such that the resin-made clip fitted into the fitting hole fills a gap, and the resin-made clip may be sandwiched by the outer wall and the inner wall to fasten the protector member and the reinforcement.

According to the attachment structure for the protector member, the front face wall of the reinforcement is inserted into the groove portion of the protector member together with the resin-made clip, and the resin-made clip fills the groove portion. In a case wherein a groove width of the groove portion is narrow, it is necessary to form the groove portion using a thin mold, and it is difficult to obtain strength in a mold for forming the groove portion. In this respect, in the aforementioned structure, the resin-made clip fills the groove portion so as to suppress the shift of the attachment position of the protector member, and the groove width of the groove portion can be extended. As a result, since the strength in the mold can be enhanced as well, productivity of the protector member can be improved.

In the attachment structure for the protector member, the reinforcement may comprise the front face wall wherein the fitting hole is formed. The resin-made clip may comprise a main member portion wherein the first hole is formed to fill the fitting hole; a hook portion integrated with the main member portion to be hooked on a back face of the front face wall; a claw portion integrated with the main member portion to be locked on the back face of the front face wall; and a flange portion integrated with the main member portion to abut against a front face of the front face wall.

According to the attachment structure for the protector member, an attachment operation of the resin-made clip relative to the fitting hole can be easily carried out from a front face side of the front face wall.

DETAILED DESCRIPTION OF THE INVENTION

One embodiment of the invention is explained, wherein an attachment structure for a protector member is embodied. Hereinafter, (A) an overall structure of the attachment structure for the protector member (hereinafter, simply called the attachment structure), (B) a structure of a resin-made clip, (C) a structure of the protector member, and (D) an operation of the attachment structure for the protector member will be explained in that order.

[A: Overall Structure of the Attachment Structure]

Figure 1:
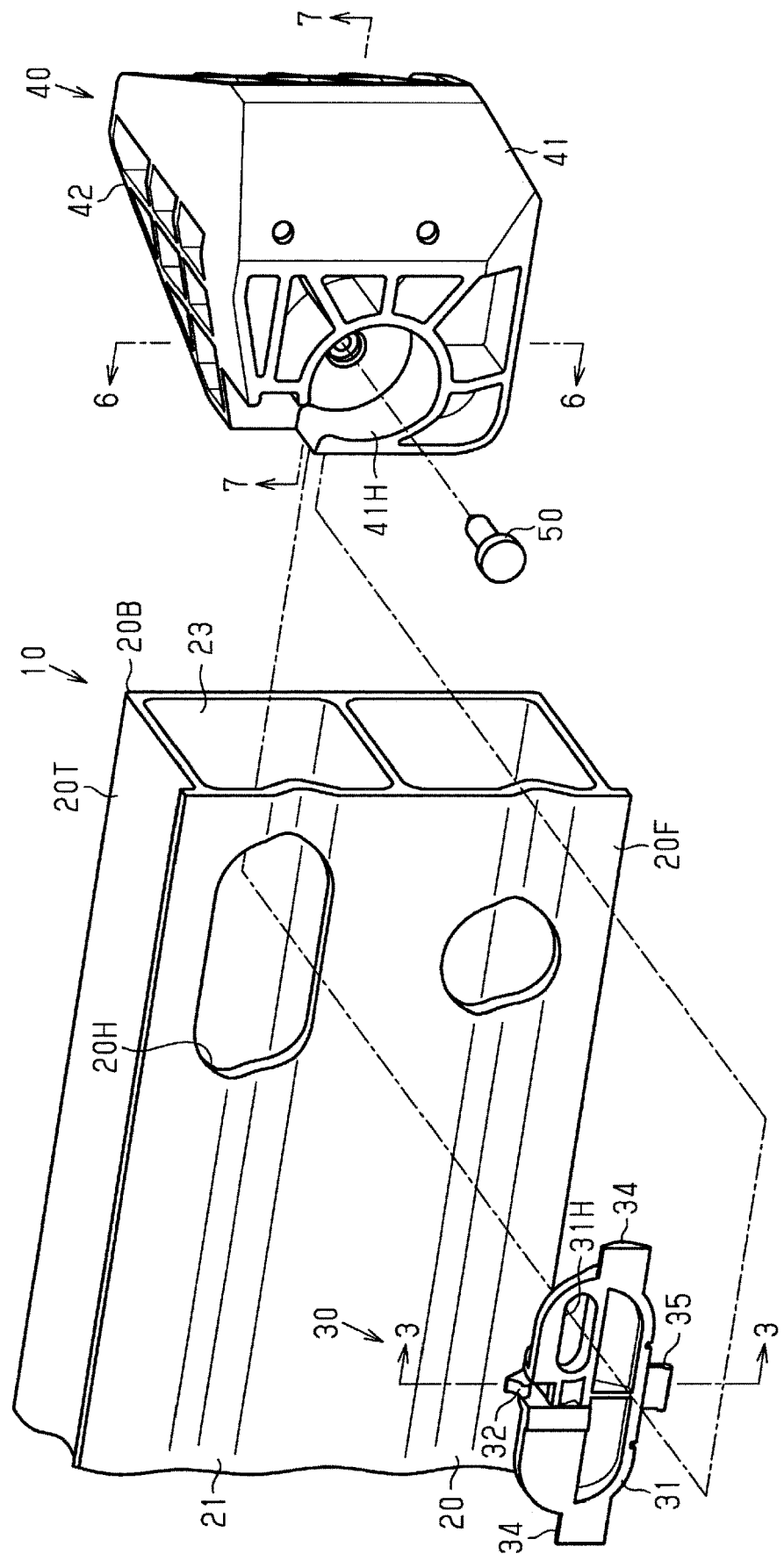
FIG. 1 is an exploded perspective view in one embodiment of an attachment structure for a protector member.

As shown in FIG. 1, a reinforcement for a vehicle (hereinafter, shown as a reinforcement 10) comprises a reinforcement main member 20 and a resin-made clip 30. The reinforcement main member 20 is a rectangular tubular member made of aluminum and extending in a longitudinal direction. The resin-made clip 30 is attached to the reinforcement main member 20.

A reinforcement front face wall 20F which is a front face wall of the reinforcement main member 20 faces a bumper for the vehicle (hereinafter, shown as a bumper B, see FIG. 6). The reinforcement front face wall 20F is located away from the bumper B. A reinforcement back face wall 20B which is a back face wall of the reinforcement main member 20 is fixed to a body of the vehicle. A reinforcement upper face wall 20T which is an upper face wall of the reinforcement main member 20 connects the reinforcement front face wall 20F with the reinforcement back face wall 20B. Hereinafter, the longitudinal direction of the reinforcement main member 20 will be explained as a right-and-left direction. Also, a bumper B side relative to the reinforcement 10 will be a front face side, a body side relative to the reinforcement 10 will be a back face side, and a direction of facing the reinforcement back face wall 20B from the reinforcement front face wall 20F will be a front-and-back direction.

The reinforcement front face wall 20F comprises an abutted wall portion 21 extending in the right-and-left direction. The abutted wall portion 21 includes a curved plate shape recessed toward the reinforcement back face wall 20B from the reinforcement front face wall 20F. The reinforcement front face wall 20F comprises a fitting hole 20H extending in the right-and-left direction. The fitting hole 20H passes through the reinforcement front face wall 20F, and is formed in such a way so as to cross the abutted wall portion 21 in the up-and-down direction. The fitting hole 20H is a hole used for fastening the reinforcement 10 and the body, and is the hole wherein the resin-made clip 30 is attached.

Figure 6:
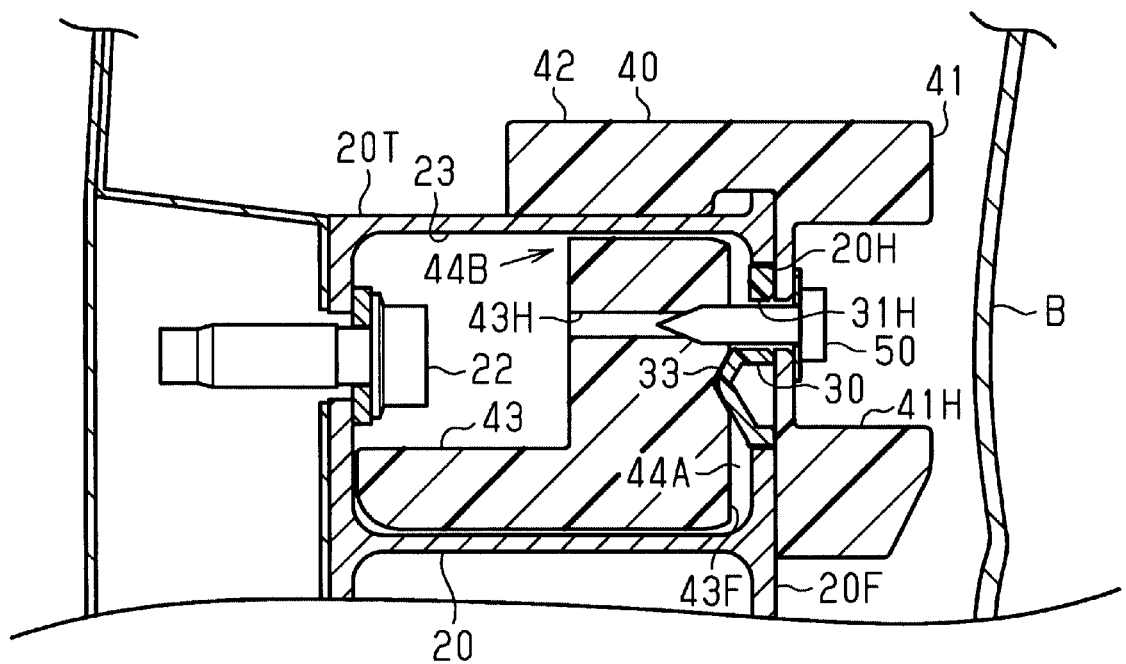
FIG. 6 is a side cross-sectional view showing the attachment structure for the protector member in one embodiment.

The reinforcement back face wall 20B is fixed to the body of the vehicle by a fastening bolt 22 (see FIG. 6). The fitting hole 20H has a size for passing the fastening bolt 22 from the reinforcement front face wall 20F, and is used for an operation of fastening the reinforcement main member 20 to the body. Incidentally, in an operation of attaching a protector member 40 to the reinforcement 10, first, the resin-made clip 30 is attached relative to the reinforcement main member 20 fixed to the body of the vehicle. Next, the protector member 40 is fastened relative to the reinforcement main member 20 wherein the resin-made clip 30 is attached by a fastening member 50.

Attachment end portions 23 of the reinforcement main member 20 are end portions in the right-and-left direction of the reinforcement main member 20, and open toward an outside in the right-and-left direction. The protector member 40 is attached to the attachment end portions 23 of the reinforcement main member 20. Incidentally, the protector member 40 is attached to both attachment end portions 23 in the right-and-left direction of the reinforcement 10.

The protector member 40 comprises a protector front face wall 41 and a protector upper face wall 42. The protector front face wall 41 comprises a fastening cavity 41H into which the fastening member 50 is inserted. The protector member 40 is attached in such a way so as to close an opening of the attachment end portion 23. In one portion of the protector front face wall 41, one portion of the resin-made clip 30 and the fastening cavity 41H face each other to cover one portion of the resin-made clip 30 from the front face side. One portion of the protector upper face wall 42 covers an end portion of the reinforcement upper face wall 20T from an upper face side.

[B: Resin-Made Clip]

Figure 2:
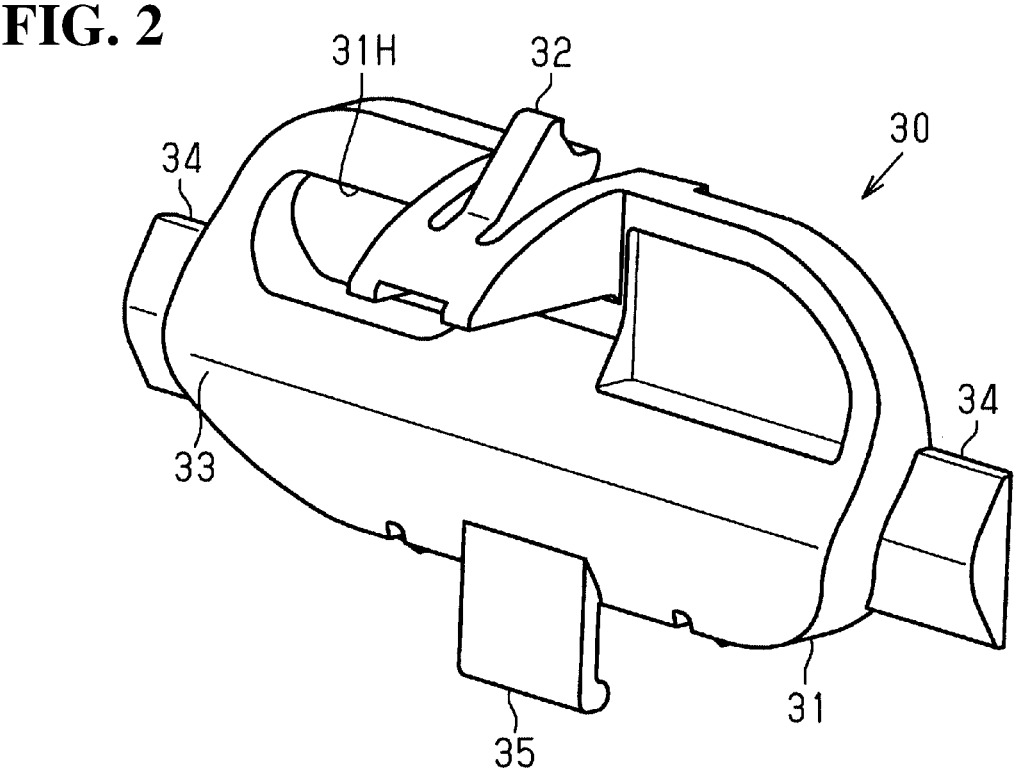
FIG. 2 is a perspective view showing a structure of a clip in one embodiment.

FIG. 2 is a rear-face perspective view wherein the resin-made clip 30 is viewed from the reinforcement back face wall 20B.

As shown in FIG. 2, the resin-made clip 30 comprises a clip main member portion 31, a claw portion 32, a right-and-left pair of flange portions 34, and a hook portion 35. The claw portion 32, the respective flange portions 34, and the hook portion 35 are integrated with the clip main member portion 31. Namely, the resin-made clip 30 is an integrated resin molded member.

The clip main member portion 31 has an oval plate shape so as to fill an approximately whole of the fitting hole 20H. The clip main member portion 31 comprises an engaging face 33 gently projecting toward the back face side. The engaging face 33 has a shape following the abutted wall portion 21 of the reinforcement front face wall 20F. The clip main member portion 31 comprises a clip insertion hole 31H which is one example of a first hole. The clip insertion hole 31H passes through the clip main member portion 31 in the front-and-back direction. The clip insertion hole 31H has an oval hole (a long hole) having a diameter larger than that of the fastening member 50, and extending in the right-and-left direction.

The claw portion 32 projects toward the reinforcement back face wall 20B (toward the front of the drawings) from an upper end of the clip main member portion 31. The claw portion 32 has a claw shape tapering toward the back face side from the front face side, and has a shape lockable with an inner face of the reinforcement front face wall 20F. Each flange portion 34 extends toward the outside in the right-and-left direction from an end in the right-and-left direction in the clip main member portion 31. Each flange portion 34 has a flat triangular prism shape extending in the right-and-left direction, and has a shape following the abutted wall portion 21 of the reinforcement front face wall 20F. The hook portion 35 projects downwardly from a lower end of the clip main member portion 31. The hook portion 35 has a thin plate shape which is elastically deformable in the front-and-back direction, and can be hooked on the inner face of the reinforcement front face wall 20F.

Figure 3:
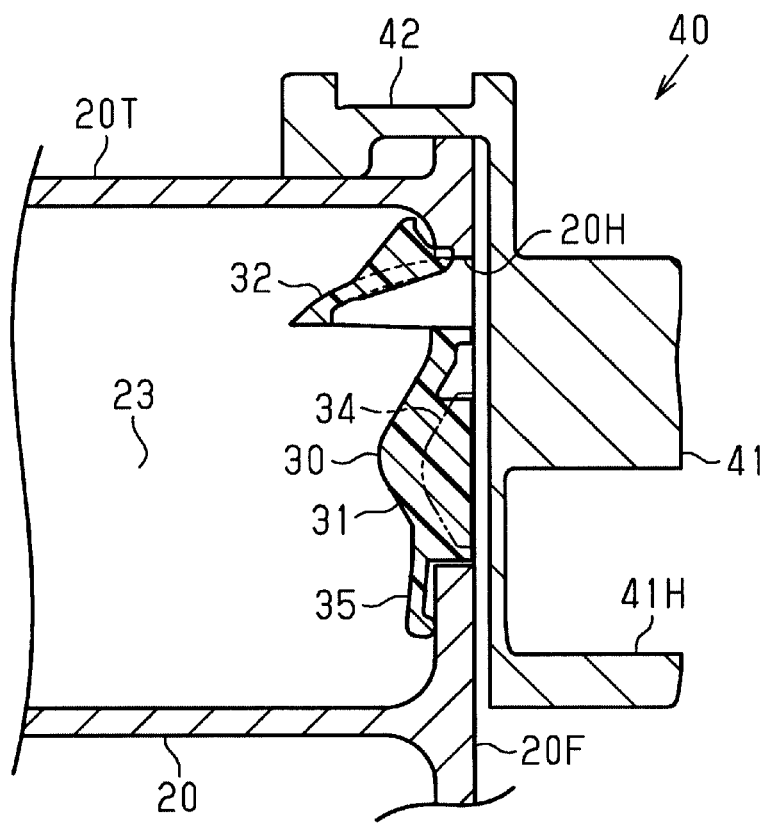
FIG. 3 is a cross-sectional view showing a cross-sectional structure of the clip with a reinforcement in one embodiment.

As shown in FIG. 3, in the resin-made clip 30 fitted into the fitting hole 20H, the hook portion 35 is hooked on a back face of the reinforcement front face wall 20F at the lower end of the clip main member portion 31 fitted into the fitting hole 20H. The hook portion 35 to be hooked on the reinforcement front face wall 20F urges the clip main member portion 31 to the front face side. The claw portion 32 is locked on the back face of reinforcement front face wall 20F at the upper end of the clip main member portion 31 fitted into the fitting hole 20H. Also, each flange portion 34 abuts against the abutted wall portion 21 (see FIG. 1) of the aforementioned reinforcement front face wall 20F from the front face side to press the abutted wall portion 21 to the back face side.

Then, when the resin-made clip 30 fits into the fitting hole 20H, first, the hook portion 35 is hooked on the back face of the reinforcement front face wall 20F from a front side of the reinforcement front face wall 20F through the fitting hole 20H. Next, the claw portion 32 is pushed into the fitting hole 20H from the front side of the reinforcement front face wall 20F to engage with the back face of the reinforcement front face wall 20F. Simultaneously, the pair of flange portions 34 abuts against a front face of the abutted wall portion 21. Thereby, the claw portion 32, the hook portion 35, and the pair of flange portions 34 clamp the reinforcement front face wall 20F. Also, the clip insertion hole 31H is positioned in the reinforcement front face wall 20F.

[C: Protector Member]

Figure 4:
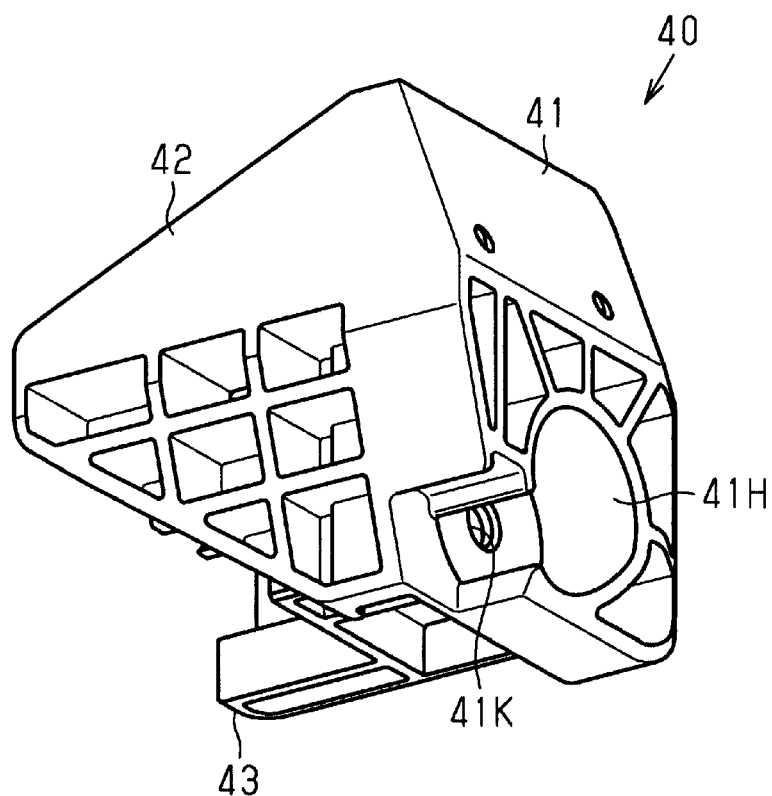
FIG. 4 is a perspective view showing an upper-face perspective structure of the protector member in one embodiment.

As shown in FIG. 4, the protector member 40 comprises the protector front face wall 41 which is one example of an outer wall, the protector upper face wall 42, and a protector inner insertion portion 43 which is one example of an inner wall. The protector front face wall 41, the protector upper face wall 42, and the protector inner insertion portion 43 are an integrated resin molded member.

The protector front face wall 41 comprises the fastening cavity 41H recessed on the back face side. The fastening cavity 41H is a circular hole with a bottom having a diameter larger than that of a head portion of the fastening member 50. A bottom portion of the fastening cavity 41H comprises an insertion hole 41K. The insertion hole 41K is a circular hole passing through the protector front face wall 41 in the front-and-back direction toward the protector inner insertion portion 43. The fastening cavity 41H and the insertion hole 41K are one example of a second hole through which the fastening member 50 passes, and determine a position of the fastening member 50 relative to the protector member 40.

Figure 5:
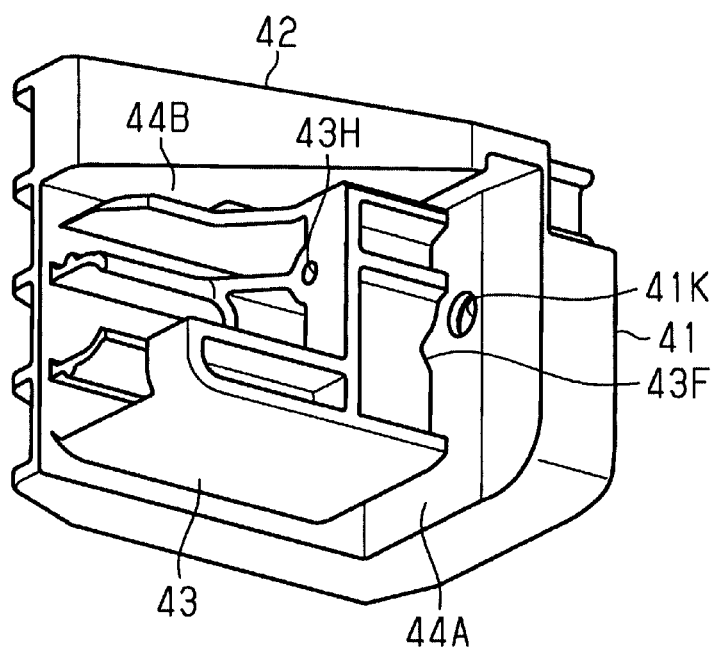
FIG. 5 is a perspective view showing a lower-face perspective structure of the protector member in one embodiment.

As shown in FIG. 5, the protector inner insertion portion 43 comprises a plurality of ribs extending in the front-and-back direction, and has a cuboid shape cut out in the front-and-back direction. The protector inner insertion portion 43 divides a first groove portion 44A between the protector inner insertion portion 43 and the protector front face wall 41. An engaged face 43F which is a front face of the protector inner insertion portion 43 has a shape following an inner face of the abutted wall portion 21, i.e. the engaging face 33 of the resin-made clip 30. The first groove portion 44A is one example of a groove portion to which an end portion of the reinforcement front face wall 20F and the resin-made clip 30 attached to the end portion thereof are inserted. The first groove portion 44A has a groove width wider than a width of the reinforcement front face wall 20F in the front-and-back direction.

Incidentally, in a case wherein the groove width of the first groove portion 44A is narrow, a thin mold becomes necessary to form the first groove portion 44A, so that it becomes difficult to obtain strength in a mold for forming the first groove portion 44A. In contrast, in a structure wherein the groove width of the first groove portion 44A is wider than the width of the reinforcement front face wall 20F, sufficient strength is obtained in the mold for forming the first groove portion 44A.

Then, the reinforcement front face wall 20F is inserted into the first groove portion 44A together with the resin-made clip 30, and the resin-made clip 30 fills the first groove portion 44A such that the engaging face 33 is hooked on the engaged face 43F of the protector inner insertion portion 43. Thereby, even in a structure wherein the groove width of the first groove portion 44A is wide, an attachment position of the protector member 40 is suppressed from shifting in the front-and-back direction relative to the reinforcement 10. Also, since the strength in the mold can be enhanced, productivity of the protector member 40 can be improved.

The protector inner insertion portion 43 divides a second groove portion 44B between the protector inner insertion portion 43 and the protector upper face wall 42. The second groove portion 44B is a groove portion to which the end portion of the reinforcement upper face wall 20T is inserted. In a state wherein the protector member 40 is attached to the reinforcement 10, the reinforcement front face wall 20F and the resin-made clip 30 are inserted into the first groove portion 44A, and the reinforcement upper face wall 20T is inserted into the second groove portion 44B, and furthermore, the protector inner insertion portion 43 is inserted into the attachment end portion 23.

The protector inner insertion portion 43 comprises a fastening hole 43H extending in the front-and-back direction at a position facing the fastening cavity 41H. The fastening hole 43H comprises a female screw to be screwed into the fastening member 50.

[D: Operation of the Attachment Structure]

As shown in FIG. 6, when the protector member 40 is attached to the reinforcement 10, first, the protector inner insertion portion 43 is inserted into the attachment end portion 23 of the reinforcement 10, and the reinforcement front face wall 20F is inserted into the first groove portion 44A. Also, the reinforcement upper face wall 20T is inserted into the second groove portion 44B. Next, the fastening member 50 is inserted into the fastening cavity 41H and the insertion hole 41K, and begins to be fastened to the fastening hole 43H through the clip insertion hole 31H.

Figure 7:
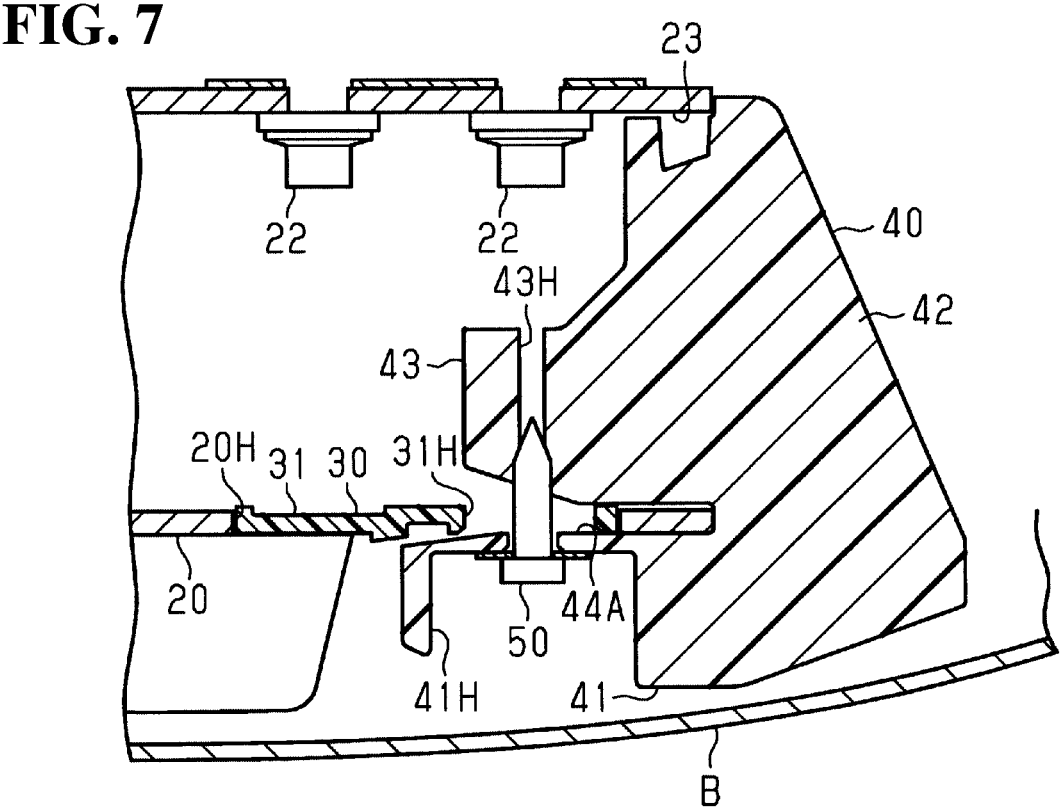
FIG. 7 is a front cross-sectional view showing the attachment structure for the protector member in one embodiment.

At that time, as shown in FIG. 7, the fastening member 50 is screwed into the fastening hole 43H, so that the fastening member 50 is positioned on the protector member 40. On the other hand, the fastening member 50 is loosely inserted into the clip insertion hole 31H, so that in the right-and-left direction, the fastening member 50 is movable relative to the reinforcement 10. As a result, in a state wherein the protector member 40 is temporarily fastened to the reinforcement 10, a position in the right-and-left direction of the protector member 40 becomes adjustable.

Then, a position where the protector member 40 is to be originally disposed is determined by a position of the bumper B and the like, and while a position of the protector member 40 is being adjusted at that position, fastening of the fastening member 50 is carried out. The fastening member 50 fastens the protector member 40 and the reinforcement 10 by pressing the bottom portion of the fastening cavity 41H against the resin-made clip 30 in such a way so as to clamp the resin-made clip 30 between the protector front face wall 41 and the protector inner insertion portion 43.

As mentioned above, according to the aforementioned embodiment, the following described effects can be obtained.

(1) In the attachment position of the protector member 40, there is an occurrence of a shift in the right-and-left direction caused by a dimension error of the reinforcement 10. In this respect, the reinforcement 10 and the protector member 40 are relatively displaceable in the right-and-left direction, so that even in a case wherein there is the occurrence of the shift at the attachment position, the protector member 40 can be disposed at the position to be originally disposed. As a result, the protector member 40 can be disposed at an attachment position to be originally required.

(2) In a state wherein the fastening member 50 is inserted to pass through the clip insertion hole 31H or the fastening cavity 41H, and in a state before the fastening is completed, the protector member 40 can be displaced. Consequently, when the attachment position of the protector member 40 is adjusted, the protector member 40 can be temporarily fastened, and a load in an adjustment operation of the position of the protector member 40 is reduced.

(3) The protector member 40 and the resin-made clip 30 are fastened, and by a displacement of the protector member 40 relative to the resin-made clip 30, a displacement of the protector member 40 relative to the reinforcement 10 can be carried out. Consequently, upon a structure wherein the attachment position of the protector member 40 is adjustable, an occurrence of a design change in the reinforcement main member 20 can be suppressed.

(4) Since the groove width of the first groove portion 44A is wider than the width of the reinforcement front face wall 20F, the sufficient strength can be obtained in the mold for forming the first groove portion 44A so as to improve the productivity of the protector member 40.

(5) The resin-made clip 30 fills the first groove portion 44A such that the engaging face 33 is hooked on the engaged face 43F of the protector inner insertion portion 43, so that even in the structure wherein the groove width of the first groove portion 44A is wide, the attachment position of the protector member 40 is suppressed from shifting relative to the reinforcement 10.

(6) The resin-made clip 30 comprises the claw portion 32 and the hook portion 35, which can be inserted into the fitting hole 20H; and the flange portions 34 abutting against the front face of the reinforcement front face wall 20F. Consequently, the attachment operation of the resin-made clip 30 relative to the fitting hole 20H can be carried out from the front face side of the reinforcement front face wall 20F.

Incidentally, the aforementioned embodiment can be carried out by changing it accordingly as follows.

[Long Hole]

The reinforcement 10 comprises a through-hole corresponding to the clip insertion hole 31H on the reinforcement front face wall 20F, and can omit the fitting hole 20H and the resin-made clip 30 from the reinforcement front face wall 20F. Namely, in the fastening structure of fastening the protector member 40 to the reinforcement main member 20, the fastening member 50 is inserted to pass through the first hole provided in the reinforcement main member 20 and the second hole provided in the protector member 40, and the first hole can be provided as the long hole extending in the right-and-left direction. In that structure as well, the aforementioned effects described in (1), (2), and (4) can be obtained.

In the protector member 40, a shape of the insertion hole 41K can be provided as the long hole extending in the right-and-left direction, and the fastening hole 43H can be omitted. At that time, the fastening member 50 is inserted to pass through the clip insertion hole 31H and the insertion hole 41K, and is screwed into a nut and the like, thereby fastening the reinforcement 10 and the protector member 40.

Namely, in the fastening structure of fastening the protector member 40 to the reinforcement 10, the fastening member 50 is inserted to pass through the first hole provided in the reinforcement 10 and the second hole provided in the protector member 40, and the first hole and the second hole can be provided as the long hole extending in the right-and-left direction.

In that structure as well, the aforementioned effects described in (1) to (6) can be obtained. Incidentally, in terms of carrying out the fastening between the reinforcement 10 and the protector member 40 by the operation from the front face side rather than the reinforcement front face wall 20F, the protector member 40 preferably comprises the fastening hole 43H.

Also, in the aforementioned modified example, the clip insertion hole 31H of the resin-made clip 30 can be modified to a circular hole through which the fastening member 50 can pass. Namely, in the fastening structure of fastening the protector member 40 to the reinforcement 10, the fastening member 50 is inserted to pass through the first hole provided in the reinforcement and the second hole provided in the protector member 40, and the second hole can be provided as the long hole extending in the right-and-left direction. In that structure as well, the aforementioned effects described in (1) to (6) can be obtained.

[Resin-Made Clip]

As a structure attached to the reinforcement front face wall 20F, the resin-made clip 30 comprises the claw portion 32 and the flange portions 34, and the hook portion 35 can be omitted. In that structure as well, the aforementioned effects described in (1) to (5) are obtained.

In the reinforcement 10, the through-hole corresponding to the clip insertion hole 31H is provided in the reinforcement front face wall 20F, and the resin-made clip 30 can be omitted. Incidentally, provided that the reinforcement 10 is formed to include the fitting hole 20H, the fastening between the reinforcement 10 and the body can be carried out through the fitting hole 20H, so that as mentioned above, the occurrence of the design change in the reinforcement 10 can be suppressed.

While the invention has been explained with reference to the specific embodiments of the invention, the explanation is illustrative and the invention is limited only by the appended claims.

What is claimed is:

1. An attachment structure comprising:
    a protector member made of resin and having a hole;
    a reinforcement including a reinforcement main member having a fitting hole;
    a resin-made clip having another hole, and fitting into the fitting hole of the reinforcement main member configured to be located between the reinforcement and a bumper through the protector member; and
    a fastening member inserted to pass through the hole of the protector member and the another hole of the clip to fasten the protector member to the reinforcement such that an attachment position of the protector member is adjustable in a longitudinal direction of the reinforcement main member,
    wherein at least one of the hole and the another hole is an elongated hole extending in the longitudinal direction of the reinforcement so that an attachment position of the protector member is adjustable by a displacement of the protector member relative to the clip.

2. An attachment structure according to claim 1, wherein the reinforcement includes a front face wall where the fitting hole is formed,
    the protector member includes an outer wall where the hole is formed and facing the bumper, an inner wall facing the outer wall, and a groove portion divided into the outer wall and the inner wall, wherein the front face wall is inserted into the groove portion together with the resin-made clip so that the resin-made clip fitted into the fitting hole fills a gap, and
    the fastening member sandwiches the resin-made clip by the outer wall and the inner wall to fasten the protector member to the reinforcement.

3. An attachment structure according to claim 1, wherein the reinforcement includes a front face wall where the fitting hole is formed, and
    the resin-made clip includes a main member portion where the another hole is formed and filling the fitting hole, a hook portion integrated with the main member portion to be hooked on a back face of the front face wall, a claw portion integrated with the main member portion to be locked on the back face of the front face wall, and a flange portion integrated with the main member portion to abut against a front face of the front face wall.

4. An attachment structure according to claim 1, wherein the clip includes a main member, a claw portion at an upper portion of the main member, and a hook portion at a lower portion of the main member, and the clip attached to the protector member is inserted into the fitting hole of the reinforcement so that the claw portion and the lock portion slidably hold a part of the reinforcement together with the protector member.

* * * * *